Jan. 2, 1934.   J. R. JOHANSSON   1,941,839
PLUG COCK
Filed Aug. 6, 1932   2 Sheets-Sheet 1

Johan Rikard Johansson
INVENTOR
By [signature]
his Attorney

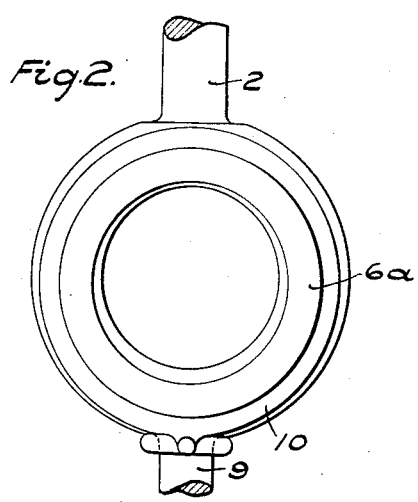
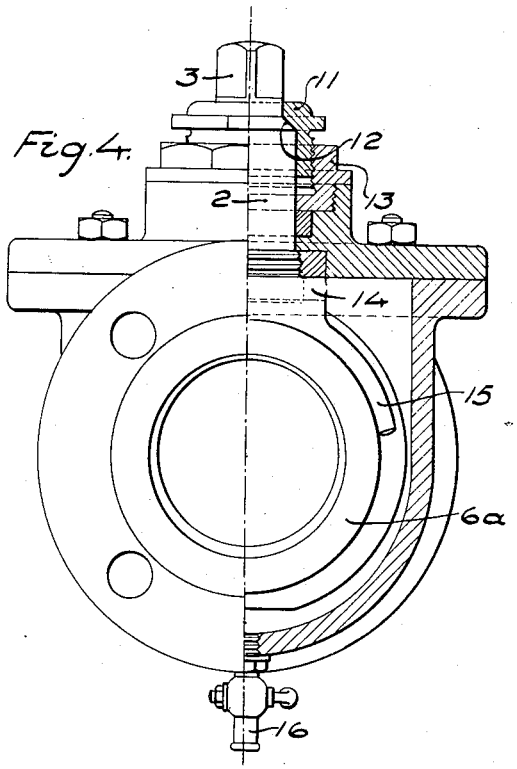
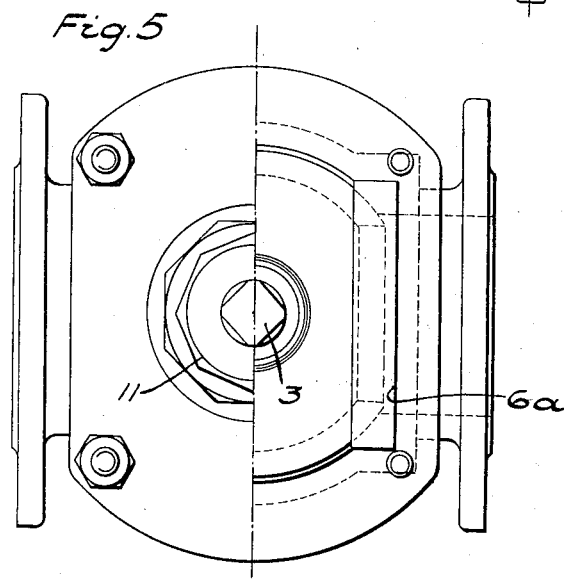

Patented Jan. 2, 1934

1,941,839

UNITED STATES PATENT OFFICE 1,941,839

PLUG COCK

Johan Rikard Johansson, Stockholm, Sweden

Application August 6, 1932, Serial No. 627,690, and in Sweden December 10, 1931

9 Claims. (Cl. 251—113)

The present invention relates to a plug cock having a spherical plug with adjustable seats.

The invention is mainly characterized in that the cock casing for the seats converges in the direction from the handle receiving portion of the plug and that the seats are slidable each along its converging wall of the cock casing, preferably by means of the plug itself.

In addition to its motion of rotation the plug can also preferably be slidable or adjustable in the direction from the handle receiving portion, and the plug is also provided with or connected to means adapted to take the seats along in the sliding motion.

Two embodiments of the invention are shown in the accompanying drawings, in which Figures 1 and 2 show one embodiment, and Figures 3-5 the other embodiment.

Figure 2 is a lateral view of the plug with seats.

Figure 3 is the other embodiment in vertical section, while Figure 4 is an end view and a partial cross section of Figure 3.

Figure 5 shows Figure 3 in view from above, certain parts being removed.

1 indicates the spherical plug, 2 the spindle of the plug, 3 its handle receiving portion, and 4 and 5 respectively inlet and outlet for the liquid. 6 and 6a indicates the seats.

According to the invention the cock casing for the seats converges in the direction from the handle receiving portion 3, the seats 6 and 6a being slidably disposed each along its converging wall 7, 7a of the cock casing.

The adjustment of the seats can, of course, take place in many different ways.

Figure 1:
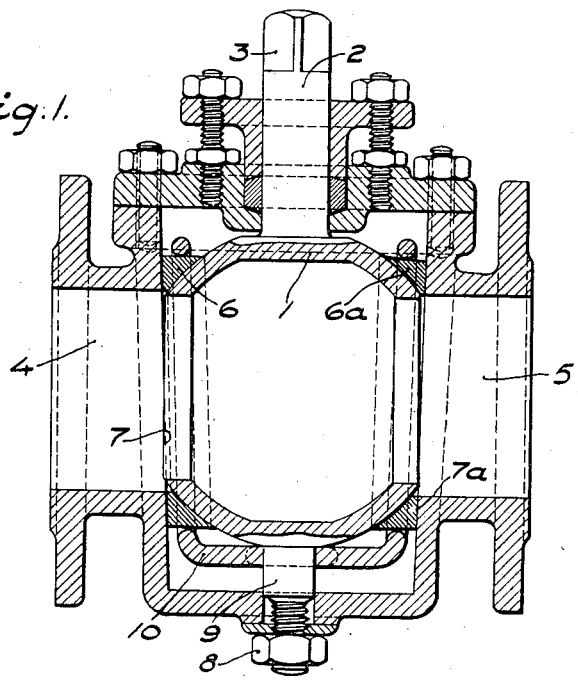
Fig. 1 is a vertical section.

In the embodiment according to Figures 1 and 2 the adjustment takes place by pulling the plug 1 in the direction toward the converging end of the cock casing by turning a nut 8 which is screwed to a projection 9 extending downward from the plug. By this means the plug is moved a little downward and brings along the seats 6, 6a, thus securing a better seal. In order to bring along the seats more reliably the plug may be connected to a strap-shaped supporter 10, the annular leg of which rests round each seat and positively carries said seat along in the motion of the plug.

Figure 3:
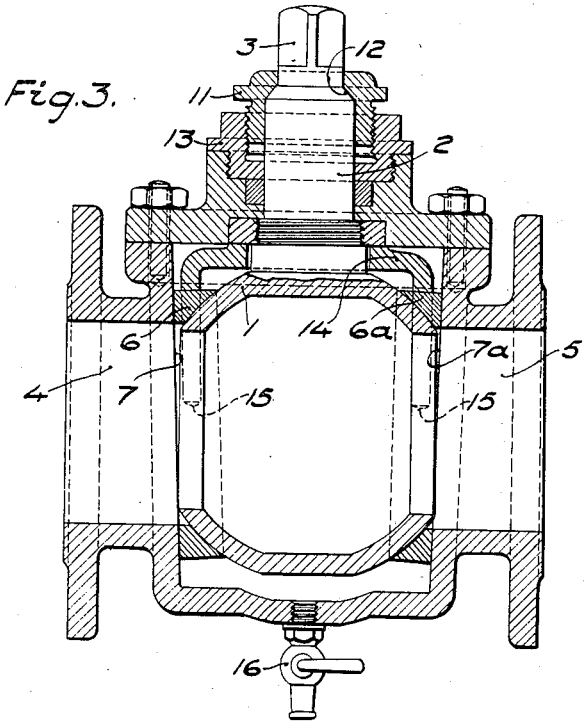

The embodiment shown in Figures 3-5 differs from the one now described in that when adjusting the seats still more the plug 1 is pressed downward by means of a sleeve nut 11 arranged on the same, said nut resting with a conical resting surface 12 on the plug and threaded into a member 13 belonging to the cock casing. A member 14 straddling the shank of the plug 1 rests with strap-shaped extensions 15 on each seat 6, 6a and carries along said seats in the motion of the plug toward the converging end of the plug casing.

In the two embodiments a drawing-off cock 16, as shown in Figures 3 and 4, may be provided. Instead of the cock a removable plug may be used.

By means of the devices described a uniform actuation of the two seats is obtained, and the plug as well as the seats may readily be removed in the same direction.

Having now described my invention, what I claim as new and desire to secure by Letters Patent is:

1. In a valve structure of the class described, a casing having converging inside walls, inlet and outlet openings leading therefrom, a spherical plug within said casing, an opening in said plug adapted for alignment with said openings, and adjustable seat members disposed adjacent said openings and arranged to cooperate with said casing and plug to form a tight seal, the seats being adjusted by movement of said plug.

2. In a valve structure of the class described, a casing having converging inside walls, inlet and outlet openings leading from said casing, a spherical plug within said casing, an opening in said plug adapted for alignment with said openings, opposed floating seat members disposed adjacent said openings and arranged to cooperate with said casing and plug to form a tight seal, and means carried by said plug and cooperating therewith for simultanously moving each of said seat members with respect to said casing.

3. In a valve structure of the class described, a casing having converging inside walls, inlet and outlet openings leading from said casing, a spherical plug within said bore casing, an opening in said plug adapted for alignment with said openings, opposed floating seat members disposed adjacent said openings and arranged to cooperate with said casing and plug to form a tight seal, and a yoke secured to said plug having arms adapted to bear against each of said seat members to retain them in seating position.

4. A valve structure of the class described comprising a casing having converging inside walls, a spherical plug within said casing and opposed annular floating seat members arranged to cooperate with said casing and plug to form a tight seal, the seats being adjusted by movement of said plug.

5. A valve structure of the class described comprising a casing having converging inside walls, a spherical plug within said casing and opposed, annular floating seat members arranged to cooperate with said casing and plug to form a tight seal, and a yoke secured to said plug having arms bearing against said seat members to retain each of them in seating position.

6. In a valve structure of the class described, a casing having converging inside walls, inlet and outlet openings leading from said casing, a spherical plug within said casing, an opening in said plug adapted for alignment with said openings, opposed annular seat members arranged adjacent said openings and cooperating with said casing and plug to form a tight seal, said plug and each of said seat members being adjustable for wear with respect to said casing by movement of said plug.

7. In a valve structure of the class described, a casing having converging inside walls, inlet and outlet openings leading from said casing, a spherical plug within said casing, an opening in said plug adapted for alignment with said openings, annular floating seat members disposed adjacent said openings and cooperating with said casing and plug to form a tight seal, said seat members having a spherical face adapted to bear against said plug and a plane face to cooperate with said casing, a yoke carried by said plug, said yoke having arms adapted to bear against said seat members to retain them in seating position, and means for adjusting said plug and each of seat members with respect to said casing to take up wear.

8. In a valve structure of the class described, a casing having converging inside walls, inlet and outlet openings leading from said casing, a spherical plug within said casing, an opening in said plug adapted for alignment with said openings, oppositely disposed floating seat members disposed adjacent said openings and arranged to cooperate with said casing and plug to form a tight seal, said seat members being jointly adjustable with respect to said casing by movement of said plug.

9. In a valve of the character described, a casing having two oppositely disposed converging inside walls and inlet and outlet openings, a spherical plug in said casing, having an opening to correspond with said openings, a spindle secured to said plug and projecting outside the casing for turning the plug, seat members disposed adjacent said walls and cooperating with said plug to form a tight seal, a yoke member engaging said seat members, and means disposed opposite said spindle and engaging the yoke for moving said yoke and seat members therewith.

JOHAN RIKARD JOHANSSON.